(12) United States Patent
Richards et al.

(10) Patent No.: US 10,553,164 B1
(45) Date of Patent: *Feb. 4, 2020

(54) DISPLAY LATENCY CALIBRATION FOR LIQUID CRYSTAL DISPLAY

(71) Applicant: Facebook Technologies, LLC, Menlo Park, CA (US)

(72) Inventors: Evan M. Richards, Fremont, CA (US); Matthew Robert Fulghum, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,926

(22) Filed: Apr. 8, 2019

Related U.S. Application Data

(63) Continuation of application No. 15/495,654, filed on Apr. 24, 2017, now Pat. No. 10,311,808.

(51) Int. Cl.
*G09G 3/36* (2006.01)
*G06F 1/16* (2006.01)

(52) U.S. Cl.
CPC ............ *G09G 3/36* (2013.01); *G06F 1/163* (2013.01); *G09G 2310/08* (2013.01); *G09G 2320/0261* (2013.01); *G09G 2320/0295* (2013.01); *G09G 2320/041* (2013.01); *G09G 2320/064* (2013.01); *G09G 2320/0646* (2013.01); *G09G 2320/0693* (2013.01); *G09G 2320/103* (2013.01)

(58) Field of Classification Search
None
See application file for complete search history.

(56) References Cited

U.S. PATENT DOCUMENTS

| 10,044,912 | B2 | 8/2018 | Shiohara |
| 10,140,955 | B1 | 11/2018 | Richards et al. |
| 2005/0231492 | A1 | 10/2005 | Shen et al. |
| 2006/0033698 | A1 | 2/2006 | Chen et al. |
| 2007/0164776 | A1 | 7/2007 | Chang et al. |

(Continued)

OTHER PUBLICATIONS

United States Office Action, U.S. Appl. No. 16/128,914, dated Jan. 8, 2019, 12 pages.

(Continued)

*Primary Examiner* — Nitin Patel
*Assistant Examiner* — Amen Woldesenbet Bogale
(74) *Attorney, Agent, or Firm* — Fenwick & West LLP (57) ABSTRACT

A system for calibrating a liquid crystal display (LCD) includes a plurality of temperature sensors, a storage medium, and a controller. Each temperature sensor measures a current temperature of at least one pixel in the LCD. The storage medium stores information about latencies for any LC-based pixel, wherein each latency corresponds to a time period for transition from a starting to an ending illumination state for one temperature of the LC-based pixel. The controller determines, based on the current temperature, the transition information and frame information, a time for each pixel in at least a portion of the LCD to transition from a first to a second illumination state. The controller computes, based on transition times, an LC transition time for at least the portion of the LCD and performs calibration of at least the portion of the LCD based on the LC transition time.

18 Claims, 5 Drawing Sheets

(56) References Cited

U.S. PATENT DOCUMENTS

| | | |
|---|---|---|
| 2007/0188711 A1 | 8/2007 | Sharp et al. |
| 2008/0094426 A1 | 4/2008 | Kimpe |
| 2008/0129671 A1 | 6/2008 | Shen et al. |
| 2008/0284720 A1* | 11/2008 | Fukutome ............ G02F 1/13454 345/102 |
| 2009/0153591 A1 | 6/2009 | Shin et al. |
| 2009/0153743 A1 | 6/2009 | Arashima |
| 2009/0174634 A1 | 7/2009 | Kohno |
| 2010/0292945 A1* | 11/2010 | Reynolds ............... G06F 3/044 702/65 |
| 2011/0063312 A1 | 3/2011 | Hong et al. |
| 2011/0141090 A1 | 6/2011 | Hong |
| 2011/0205202 A1 | 8/2011 | Son et al. |
| 2012/0019568 A1 | 1/2012 | Nobori |
| 2012/0050280 A1 | 3/2012 | Kim |
| 2012/0113099 A1 | 5/2012 | Kim et al. |
| 2012/0280698 A1* | 11/2012 | Oya .................... G06F 3/03547 324/658 |
| 2012/0320107 A1 | 12/2012 | Murakami et al. |
| 2013/0050422 A1 | 2/2013 | Flynn |
| 2013/0100173 A1 | 4/2013 | Chaji et al. |
| 2013/0286053 A1 | 10/2013 | Fleck et al. |
| 2014/0125569 A1* | 5/2014 | Nakata ................ G09G 3/3648 345/87 |
| 2014/0375679 A1 | 12/2014 | Margolis et al. |
| 2016/0116979 A1 | 4/2016 | Border |
| 2017/0034401 A1 | 2/2017 | Shiohara |
| 2017/0039960 A1 | 2/2017 | Jepsen |
| 2017/0212717 A1 | 7/2017 | Zhang |
| 2017/0365207 A1 | 12/2017 | Maaranen et al. |
| 2018/0059464 A1 | 3/2018 | Asaumi et al. |
| 2018/0075798 A1 | 3/2018 | Nho et al. |
| 2018/0084232 A1 | 3/2018 | Belenkii et al. |
| 2018/0143757 A1 | 5/2018 | Champion et al. |
| 2018/0144682 A1 | 5/2018 | Tao et al. |
| 2018/0190011 A1 | 7/2018 | Platt et al. |
| 2018/0204525 A1 | 7/2018 | Comps et al. |
| 2018/0293424 A1 | 10/2018 | Venkataraman et al. |
| 2018/0301095 A1 | 10/2018 | Runyan et al. |
| 2018/0308204 A1 | 10/2018 | Parikh et al. |
| 2018/0336823 A1 | 11/2018 | Lin et al. |

OTHER PUBLICATIONS

United States Office Action, U.S. Appl. No. 16/298,765, dated Apr. 18, 2019, 15 pages.

* cited by examiner

Obtain and store transition information about latencies for a pixel of a plurality of pixels of a liquid crystal display (LCD), wherein each latency corresponds to a time period for transition from a defined start state of illumination to a defined end state of illumination for one temperature associated with the pixel
410

Measure a current temperature associated with each pixel in at least a portion of the plurality of pixels
420

Obtain frame information related to at least two consecutive frames of video content to be displayed on at least the portion of the plurality of pixels
430

Determine, based on the current measured temperature, the transition information and the frame information, a transition time for each pixel in at least the portion of the plurality of pixels to transition from a start state of illumination to an end state of illumination for the current measured temperature of that pixel
440

Compute, based on determined transition times for all pixels in at least the portion of the plurality of pixels, an effective liquid crystal (LC) transition time for at least the portion of the plurality of pixels
450

Calibrate at least the portion of the plurality of pixels based on the effective LC transition time
460

DISPLAY LATENCY CALIBRATION FOR LIQUID CRYSTAL DISPLAY

CROSS REFERENCE TO RELATED APPLICATIONS

This application is a continuation of co-pending U.S. application Ser. No. 15/495,654, filed Apr. 24, 2017, which is incorporated by reference in its entirety.

BACKGROUND

The present disclosure generally relates to calibration of an electronic display, and specifically relates to a display latency calibration for a liquid crystal display panel.

An electronic display having illumination elements or pixels designed based on liquid crystal (LC) cells can be referred to as a liquid crystal display (LCD) panel or an LCD. Each illumination element in an LCD experiences a certain delay or latency required for that illumination element to reach a desired state of illumination. A latency of an illumination element in an LCD to transition from a starting state of illumination to an ending state of illumination can be referred to as an LC transition time. The LC transition time is a function of several variables, such as a current temperature of the illumination element, a current or starting state of illumination, and a next or ending state of illumination. Thus, an LC transition time can be different for each illumination element of a plurality of illumination elements in an LCD. Different LC transition times of illumination elements in an LCD can negatively affect visual experience of a user to whom video content is presented via the LCD.

Therefore, calibration of an LCD is desired to take into account different LC transition times of illumination elements in the LCD.

SUMMARY

Embodiments of the present disclosure support a system for calibrating a liquid crystal display (LCD) having a plurality of illumination elements or pixels that may be organized in a two-dimensional array. The calibration system includes a plurality of temperature sensors, a storage medium, and a controller that may be coupled to the temperature sensors and the storage medium. Each temperature sensor of the plurality of temperature sensors can be configured to measure a current temperature associated with at least one pixel in at least a portion of the plurality of pixels in the LCD. The storage medium stores transition information about latencies for any liquid crystal (LC)-based pixel of the LCD, wherein each latency corresponds to a time period to transition from a specific starting illumination state to a specific ending illumination state for one temperature associated with the LC-based pixel. The starting state of illumination is related to an intensity of light emitted from the LC-based pixel in a first time instant. The ending state of illumination is related to another intensity of light emitted from the LC-based pixel in a second time instant consecutive to the first time instant. The controller may obtain frame information related to data associated with at least two consecutive frames of the video content to be displayed on at least the portion of the plurality of pixels of the LCD. The controller determines, based on the current measured temperature for each pixel, the stored transition information, and the obtained frame information, a transition time for each pixel in at least the portion of the plurality of pixels to transition from a first illumination state to a second illumination state for the current measured temperature of that pixel. The first illumination state is related to a first intensity of light emitted from that pixel for a first frame of the at least two consecutive frames, and the second illumination state is related to a second intensity of light emitted from that pixel for a second frame of the at least two consecutive frames. The controller computes, based on determined transition times for all pixels in at least the portion of the plurality of pixels, an effective LC transition time for at least the portion of the plurality of pixels. The controller performs calibration of at least the portion of the plurality of pixels of the LCD based on the effective LC transition time.

The calibration system that includes the plurality of temperature sensors, the storage medium and the controller can be integrated into a head-mounted display (HMD). The HMD may be part of, e.g., a virtual reality (VR) system, an augmented reality (AR) system, a mixed reality (MR) system, or some combination thereof.

Embodiments of the present disclosure also support a method for calibrating an LCD having a plurality of illumination elements or LC-based pixels that may be organized in a two-dimensional array. The calibration method includes storing transition information about latencies for an LC-based pixel of the LCD, wherein each latency corresponds to a time period for transition from a specific starting illumination state to a specific ending illumination state for one temperature associated with the LC-based pixel. The calibration method further includes measuring, by each temperature sensor of a plurality of temperature sensors coupled to the plurality of pixels in the LCD, a current temperature associated with at least one pixel in at least a portion of the plurality of pixels. The calibration method further includes obtaining frame information with data associated with at least two consecutive frames of video content to be displayed on at least the portion of the plurality of pixels. The calibration method further includes determining, based on the current measured temperature, on the transition information and on the obtained frame information, a transition time for each pixel in at least the portion of the plurality of pixels to transition from a first illumination state to a second illumination state for the current measured temperature of that pixel. The calibration method further includes computing, based on determined transition times for all pixels in at least the portion of the plurality of pixels, an effective LC transition time for at least the portion of the plurality of pixels, and performing calibration of at least the portion of the plurality of pixels of the LCD based on the effective LC transition time.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A time period that it takes for an illumination element of a liquid crystal display (LCD) to reach a desired state of illumination is a function of a current temperature of the illumination element, a starting illumination state of the illumination element, and an ending illumination state of the illumination element. A two-dimensional array of temperature sensors can be placed on the LCD to determine a current temperature for any given illumination element of the LCD. A time period required for each illumination element of the LCD to reach a desired state of illumination, which is based on two consecutive illumination states of that element, can be measured empirically or obtained from a manufacturer of the LCD. Then, for each frame of video content to be displayed on the LCD, a liquid crystal (LC) transition time can be determined for each illumination element, based on a currently measured temperature associated with the illumination element, a starting state of illumination associated with the illumination element and an ending state of illumination associated with the illumination element. For a global illumination of the LCD, an LC transition time is determined for the entire LCD as the longest transition time of any of the illumination elements of the LCD. For a segmented illumination of the LCD, an LC transition time is determined for each segment of the LCD as the longest transition time of any illumination element in that segment. For a controllable illumination of the LCD, an LC transition time is determined for a portion of a controllable size of the LCD as the longest transition time of any illumination element in the controllable portion of the LCD.

In some embodiments, a software development kit (SDK) used by a rendering module receives information about current temperatures of illumination elements in at least a portion of the LCD, as well as information about starting states of illumination and ending states of illumination for the illumination elements in at least the portion of the LCD. The SDK may then determine LC transition times for the illumination elements in at least the portion of the LCD. The SDK may provide corrections to rendered video frames to be displayed on the LCD, based on the determined LC transition times. In this way, the SDK provides delay latency calibration for at least the portion of the LCD. In some embodiments, the SDK can be implemented as a controller coupled to the LCD and configured to perform operations of a method for calibration of the LCD.

The system for delay latency calibration presented herein may be used in, e.g., a head-mounted display (HMD) that utilizes an LCD. The HMD may be part of, e.g., a virtual reality (VR) system, an augmented reality (AR) system, a mixed reality (MR) system, or some combination thereof. Each illumination element of the LCD is based on LC cells and can be referred to as an LC-based pixel or, simply, a pixel.

Figure 1A:
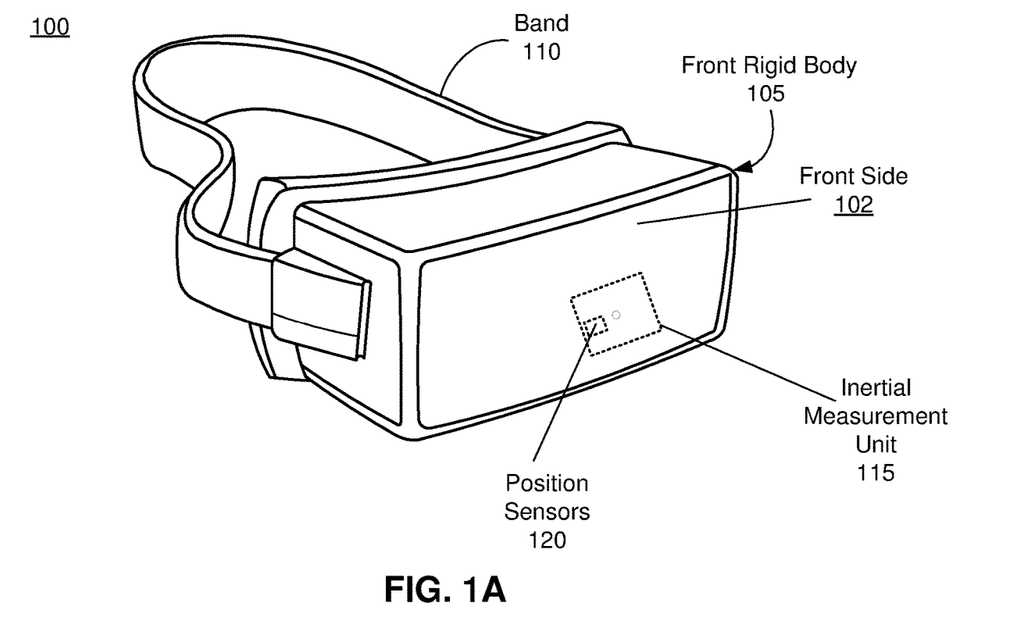
FIG. 1A is a wire diagram of a head-mounted display (HMD), in accordance with an embodiment.

FIG. 1A is a wire diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105 and a band 110. The front rigid body 105 includes one or more electronic display elements of an electronic display (not shown), an Inertial Measurement Unit (IMU) 115, and one or more position sensors 120. In the embodiment shown by FIG. 1A, the position sensors 120 are located within the IMU 115, and neither the IMU 115 nor the position sensors 120 are visible to a user wearing the HMD 100. The IMU 115 and the position sensors 120 are discussed in detail below with regard to FIG. 5.

Figure 1B:
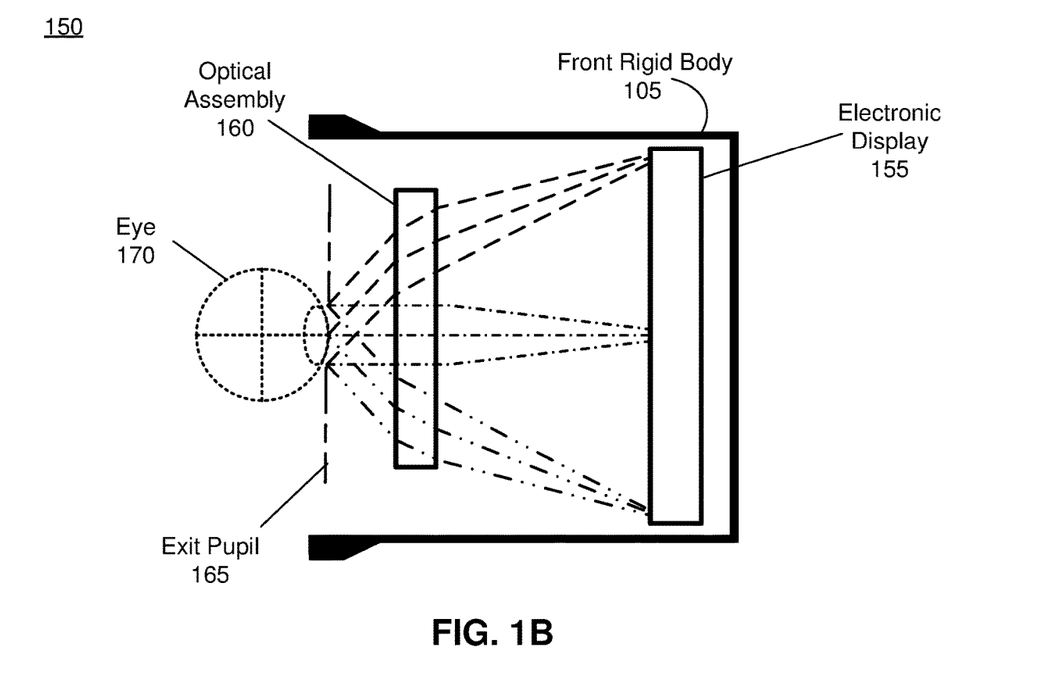
FIG. 1B is a cross section of a front rigid body of the HMD in FIG. 1A, in accordance with an embodiment.

FIG. 1B is a cross section 150 of the front rigid body 105 of the embodiment of the HMD 100 shown in FIG. 1A. As shown in FIG. 1B, the front rigid body 105 includes an electronic display 155 and an optical assembly 160 that together provide image light to an exit pupil 165. The exit pupil 165 is the location of the front rigid body 105 where a user's eye 170 is positioned. For purposes of illustration, FIG. 1B shows a cross section 150 associated with a single eye 170, but another optical assembly 160, separate from the optical assembly 160, provides altered image light to another eye of the user. Additionally, the HMD 100 includes an eye tracking system (not shown in FIG. 1B). The eye tracking system may include, e.g., one or more sources that illuminate one or both eyes of the user, and one or more cameras that captures images of one or both eyes of the user.

The electronic display 155 displays images to the user. In various embodiments, the electronic display 155 may comprise a single electronic display or multiple electronic displays (e.g., a display for each eye of a user). In accordance with embodiments of the present disclosure, the electronic display 155 is implemented as an LCD panel with illumination elements or pixels based on LC cells. The electronic display 155 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the electronic display optical elements may have one or more coatings, such as anti-reflective coatings.

The optical assembly 160 magnifies received light from the electronic display 155, corrects optical aberrations associated with the image light, and the corrected image light is presented to a user of the HMD 100. At least one optical element of the optical assembly 160 may be an aperture, a Fresnel lens, a refractive lens, a reflective surface, a diffractive element, a waveguide, a filter, a reflective surface, a polarizing reflective surface, or any other suitable optical element that affects the image light emitted from the electronic display 155. Moreover, the optical assembly 160 may include combinations of different optical elements. In some embodiments, one or more of the optical elements in the optical assembly 160 may have one or more coatings, such as anti-reflective coatings, dichroic coatings, etc. Magnification of the image light by the optical assembly 160 allows illumination elements or pixels of the electronic display 155 to be physically smaller, weigh less, and consume less power. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical assembly 160 is designed so its effective focal length is larger than the spacing to the electronic display 155, which magnifies the image light projected by the electronic display 155. Additionally, in some embodiments, the amount of magnification may be adjusted by adding or removing optical elements.

In some embodiments, the front rigid body 105 of the HMD 100 further includes an eye tracking system (not shown in FIG. 1B) integrated into the optical assembly 160 for determining and tracking a position and orientation of the user's eye 170. In alternate embodiments, the eye tracking system is integrated into the front rigid body 105 between the optical assembly 160 and the exit pupil 165. Based on the position and orientation of the user's eye 170 (i.e., an angle of eye-gaze) determined by the eye tracking system, the HMD 100 may adjust presentation of an image displayed on the electronic display 155 by adjusting resolution of the displayed image. A maximum pixel density for displaying an image on the electronic display 155 can be provided only in a foveal region of the determined eye-gaze, whereas a lower resolution is employed in other regions, without negatively affecting the user's visual experience.

Figure 2A:
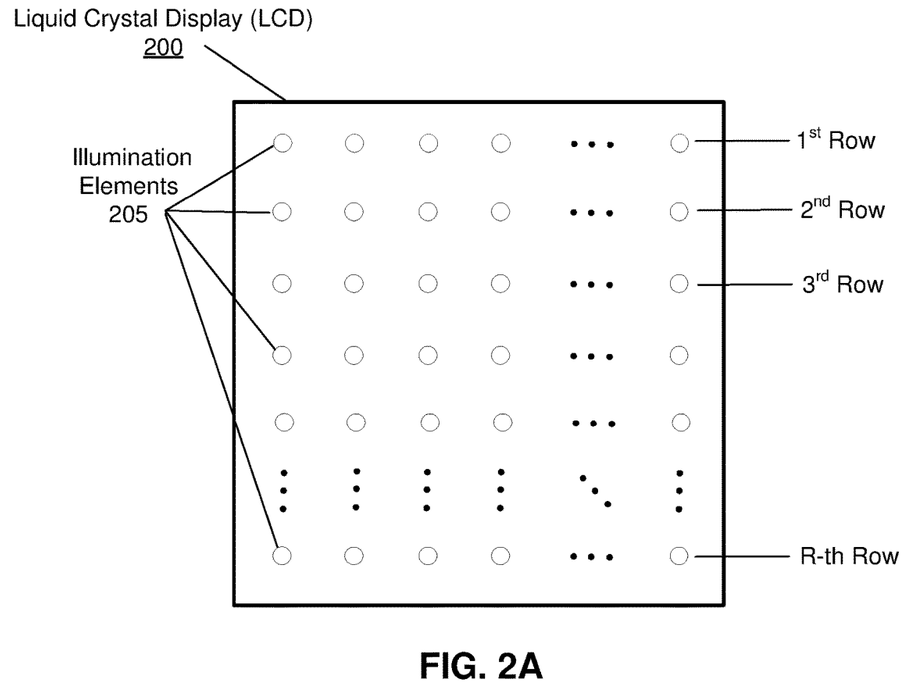
FIG. 2A illustrates a liquid crystal display (LCD) with a two-dimensional array of illumination elements or liquid crystal (LC)-based pixels, which may be part of the HMD in FIG. 1A, in accordance with an embodiment.

FIG. 2A illustrates an example LCD 200 with a two-dimensional array of illumination elements or LC-based pixels 205, in accordance with an embodiment. The LCD 200 may be part of the HMD 100 in FIG. 1A, i.e., the LCD 200 may be an embodiment of the electronic display 155 in FIG. 1B. In one embodiment, the LCD 200 may display a plurality of frames of video content based on a global illumination where all the pixels 205 simultaneously illuminate image light for each frame. In an alternate embodiment, the LCD 200 may display video content based on a segmented illumination where all pixels 205 in each segment of the LCD 200 simultaneously illuminate image light for each frame of the video content. For example, each segment of the LCD 200 may include at least one row of pixels 205 in the LCD 200, as shown in FIG. 2A. In the illustrative case where each segment of the LCD 200 for illumination includes one row of pixels 205, the segmented illumination can be referred to as a rolling illumination. For the rolling illumination, all pixels 205 in a first row of the LCD 200 simultaneously illuminate image light in a first time instant; all pixels 205 in a second row of the LCD 200 simultaneously illuminate image light in a second time instant consecutive to the first time instant; all pixels 205 in a third row of the LCD 200 simultaneously illuminate image light in a third time instant consecutive to the second time instant, and so on. Other orders of illumination of rows and segments of the LCD 200 are also supported in the present disclosure. In yet another embodiment, the LCD 200 may display video content based on a controllable illumination where all pixels 205 in a portion of the LCD 200 of a controllable size (not shown in FIG. 2A) simultaneously illuminate image light for each frame of the video content. The controllable portion of the LCD 200 can be rectangular, square or of some other suitable shape. In some embodiments, a size of the controllable portion of the LCD 200 can be a dynamic function of a frame number.

Figure 2B:
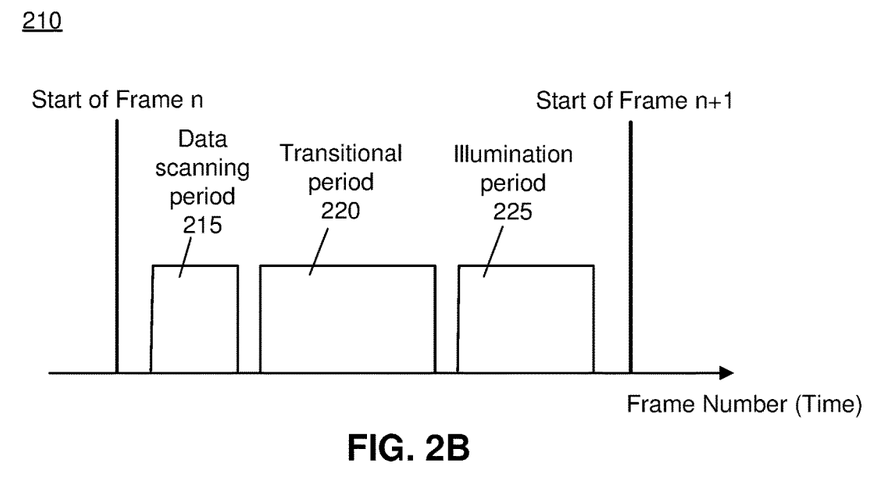
FIG. 2B is a graph illustrating a time duration of each operating phase of the LCD in FIG. 2A, in accordance with an embodiment.

FIG. 2B is a graph 210 illustrating a time duration of each operating phase of the LCD 200 in FIG. 2A, in accordance with an embodiment. The graph 210 illustrates operating phases when an arbitrary frame n of video content is processed for displaying on the LCD 200, before a next consecutive frame n+1 is being processed. During a data scanning period 215, the pixels 205 of the LCD 200 are scanned with data associated with the currently processed frame n, i.e., the pixels 205 are scanned and loaded with digital values associated with intensities of light to be emitted from the pixels 205 when displaying the current frame n. In some embodiments, during the data scanning period 215, the pixels 205 of the LCD 200 are scanned based on progressive scanning where rows of the pixels 205 are scanned in sequential order, e.g., starting with the top or first row of pixels 205, and ending with the bottom or R-th row of pixels 205. In one embodiment, for the global illumination, duration of the data scanning period corresponds to a time required for scanning all the pixels 205 in the LCD 200. In another embodiment, for the segmented illumination, a duration of the data scanning period 215 corresponds to a time required for scanning all pixels 205 in a segment of the LCD 200. In yet another embodiment, for the controllable illumination, a duration of the data scanning period 215 corresponds to a time required for scanning all pixels 205 in a controllable portion of the LCD 200.

As shown in FIG. 2B, the data scanning period 215 is followed by a transitional period 220 during which each pixel 205 in at least a portion of the LCD 200 transitions from a first illumination state to a second illumination state. An illumination state of a pixel 205 in the LCD 200 can be defined as a digital number that corresponds to an intensity of light emitted from the pixel 205. The first illumination state is represented by a digital number associated with an intensity of light emitted from each pixel 205 when displaying on the LCD 200 a previously processed frame n−1. The second illumination state is represented by another digital number associated with another intensity of light emitted from that same pixel 205 when displaying on the LCD 200 the currently processed frame n. A time period required for each pixel 205 of the LCD 200 to transition from the first (starting) illumination state to the second (ending) illumination state can be referred to as an LC transition time of that pixel 205. The LC transition time is a function of a starting illumination state, an ending illumination state, and a current temperature associated with that pixel 205. The LC transition time is longer for a lower pixel temperature and shorter for a higher pixel temperature when illumination transitions involve the same starting and ending states.

In one embodiment, for the global illumination where all the pixels 205 in the LCD 200 simultaneously illuminate image light for the currently processed frame n, a duration of the transitional period 220 in FIG. 2B corresponds to the longest LC transition time of any of the pixels 205 in the LCD 200. In another embodiment, for the segmented illumination where all pixels 205 of a segment of the LCD 200 simultaneously illuminate image light for the currently processed frame n, a duration of the transitional period 220 in FIG. 2B corresponds to the longest LC transition time of any of the pixels 205 in the segment. In yet another embodiment, for the controllable illumination where all pixels 205 of a portion of the LCD 200 with a controllable size simultaneously illuminate image light for the currently processed frame n, a duration of the transitional period 220 corresponds to the longest LC transition time of any of the pixels 205 in the controllable portion of the LCD 200.

As further shown in FIG. 2B, the transitional period 220 is followed by an illumination period 225. The illumination period 225 represents a time period during which pixels 205 in at least a portion of the LCD 200 illuminate image light for the frame n. In one embodiment, for the global illumination, all the pixels 205 in the LCD 200 simultaneously illuminate image light for the currently processed frame n during the illumination period 225. In the case of global illumination, duration of the illumination period 225 is, e.g., 2 ms. In another embodiment, for the segmented illumination, all pixels 205 in a segment of the LCD 200 simultaneously illuminate image light for the currently processed frame n during the illumination period 225. In yet another embodiment, for the controllable illumination, all pixels 205 in a portion of the LCD 200 with a controllable size simultaneously illuminate image light for the currently processed frame n during the illumination period 225.

Figure 3:
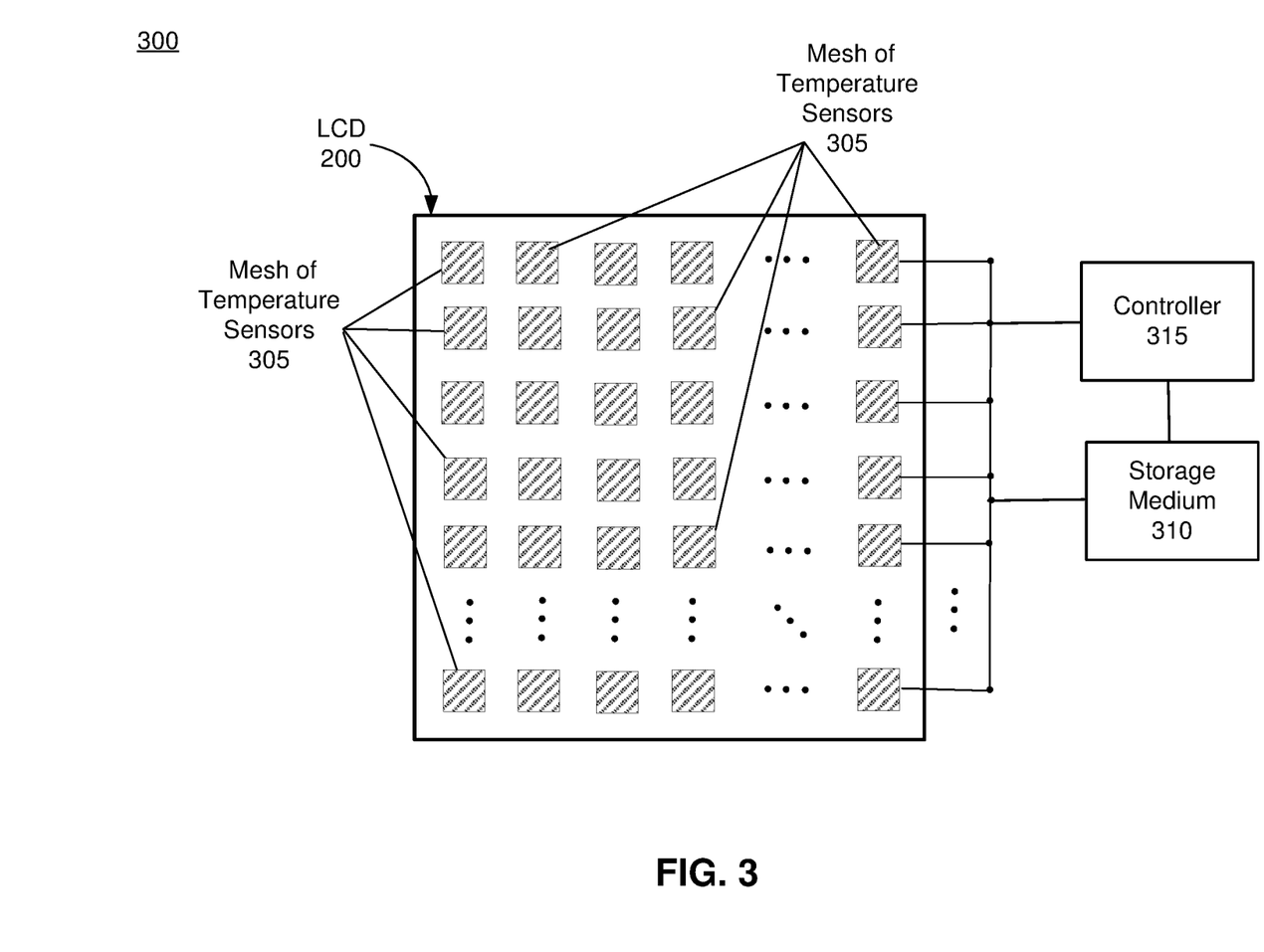
FIG. 3 illustrates an example system for display latency calibration of the LCD in FIG. 2A, in accordance with an embodiment.

FIG. 3 illustrates an example system 300 for display latency calibration of the LCD 200 in FIG. 2A, in accordance with an embodiment. As shown in FIG. 3, the calibration system 300 includes a two-dimensional array or mesh of temperature sensors 305 placed on a top portion of the LCD 200 such that the temperature sensors 305 are coupled to the LC-based pixels 205 in FIG. 2A. In some embodiments, the mesh of temperature sensors 305 is configured to measure temperatures associated with all the pixels 205 of the LCD 200 for a plurality of time instants, i.e., for each frame of video content displayed on the LCD 200. In alternate embodiments, the mesh of temperature sensors 305 is configured to measure temperatures of at least a portion of the pixels 205 of the LCD 200.

It should be understood that the mesh of temperature sensors 305 need not to correspond to the pixels 205 of the LCD 200. In some embodiments, there is 1:1 correspondence between temperature sensors in the mesh 305 and the pixels 205 of the LCD 200, where each temperature sensor in the mesh 305 is coupled to a different pixel 205 of the LCD 200 and measures a current temperature associated with that pixel 205. In some other embodiments, there is a fewer temperature sensors in the mesh 305 than the pixels 205 in the LCD 200. For example, each temperature sensor in the mesh 305 with a fewer temperature sensors than the pixels 205 in the LCD 200 can be coupled to one or more pixels 205 in any portion of the LCD 200, and can be configured to measure one or more temperatures associated with the one or more pixels 205. Alternatively, the mesh of temperature sensors 305 with a fewer temperature sensors than the pixels 205 in the LCD 200 can measure temperatures of a portion of the pixels 205 in the LCD 200.

As discussed above, a certain time period referred to herein as an LC transition time is required for each pixel 205 of the LCD 200 to transition from a first (starting) illumination state to a second (ending) illumination state, i.e., to transition from a digital number of a previously displayed frame to a new digital number of a currently displayed frame. The LC transition time is a function of the starting state, the ending state and a currently measured temperature associated with that pixel 205. In some embodiments, LC transition times can be measured empirically for a pre-defined set of pixel temperatures and different transition pairs of starting-ending illumination states. In alternate embodiments, LC transition times for a predefined set of temperatures and different transition pairs of starting-ending illumination states can be obtained from a manufacturer of the LCD 200.

As shown in FIG. 3, the calibration system 300 includes a storage medium 310 coupled to the LCD 200. The storage medium 310 stores the LC transition times obtained either empirically or from the manufacturer of the LCD 200. In the illustrative embodiment shown in FIG. 3, the storage medium 310 is separate from the LCD 200. In an alternate embodiment (not shown in FIG. 3), the storage medium 310 is part of the LCD 200. In some embodiments, the storage medium 310 is implemented as a memory, e.g., a Random Access Memory (RAM) or a Read Only Memory (ROM), which comprises a look-up table with the stored LC transition times for the pre-defined set of temperatures.

As shown in FIG. 3, the calibration system 300 further includes a controller 315 that may be coupled to both the mesh of temperature sensors 305 and the storage medium 310. The controller 315 may receive, from the mesh of temperature sensors 305, information about a measured temperature associated with each pixel 205 in at least a portion of the LCD 200. The controller 315 may obtain, e.g., from a rendering module (not shown in FIG. 3) that provides rendered video frames for displaying on the LCD 200, frame information related to at least two consecutive frames of video content displayed on the LCD 200. The frame information obtained at the controller 315 comprises information about at least two consecutive digital numbers associated with intensities of light emitted from each pixel 205 in at least the portion of the LCD 200 for the at least two consecutive frames of the video content. Thus, the controller 315 has knowledge about starting and ending states of illumination for each pixel 205 in at least the portion of the LCD 200 for the at least two consecutive frames of the video content. Based on the current measured temperature for each pixel 205 in at least the portion of the LCD 200, based on the LC transition times stored in the storage medium 310 and based on the frame information obtained from the rendering module, the controller 315 may determine an effective LC transition time for each pixel 205 in at least the portion of the LCD 200.

In some embodiments, as discussed above, the LC transition times stored in the storage medium 310 are associated with the predefined set of temperatures. If temperatures in the predefined set are different than a currently measured temperature of a pixel 205, the controller 315 may obtain, from the storage medium 310, at least one LC transition time that corresponds to at least one temperature in a defined vicinity from the currently measured temperature of the pixel 205. The controller 315 may then compute an effective LC transition time of the pixel 205 for the currently measured temperature based on the at least one LC transition time obtained from the storage medium. In one embodiment, the controller 315 may compute the effective LC transition time as a weighted average of the at least one LC transition time. In another embodiment, the controller 315 may compute the effective LC transition time based on applying interpolation to the at least one LC transition time. If the currently measured temperature of the pixel 205 is the same as one of the temperatures in the predefined set, the controller 315 can directly obtain, from the storage medium 310, an effective LC transition time for the pixel 205.

The controller 315 also determines an effective LC transition time for at least the portion of the LCD 200 as a longest time period of effective LC transition times for all pixels 205 in at least the portion of the LCD 200. The determined effective LC transition time for at least the portion of the LCD 200 corresponds to a duration of the transitional period 220 in FIG. 2B. In one embodiment, for the global illumination, the controller 315 is configured to determine the effective LC transition time and duration of the transitional period 220 for the entire LCD 200 as the longest effective LC transition time of all effective LC transition times associated with all the pixels 205 of the LCD 200. In another embodiment, for the segmented illumination, the controller 315 determines the effective LC transition time and duration of the transitional period 220 for a segment of the LCD 200 as the longest effective LC transition time of all effective LC transition times associated with all pixels 205 in the segment. In yet another embodiment, for the controllable illumination, the controller 315 determines the effective LC transition time and duration of the transitional period 220 for a controllable portion of the LCD 200 as the longest effective LC transition time of all effective LC transition times associated with all pixels 205 in the controllable portion.

The controller 315 also performs calibration of at least the portion of the LCD 200 based on the determined effective LC transition time when each rendered video frame is displayed on the LCD 200. In some embodiments, the controller 315 performs the calibration by delaying illumination of each pixel in at least the portion of the LCD 200 based on the determined effective LC transition time. In one embodiment, for the global illumination, the controller 315 performs the calibration by delaying illumination of all the pixels 205 of the LCD 200 until the longest effective LC transition time for all the pixels 205 expires. In another embodiment, for the segmented illumination, the controller 315 performs the calibration by delaying illumination of all pixels in a segment of the LCD 200 until the longest effective LC transition time for the segment expires. In yet another embodiment, for the controllable illumination, the controller 315 performs the calibration by delaying illumination of all pixels in a controllable portion of the LCD 200 until the longest effective LC transition time for the controllable portion expires.

Figure 4:
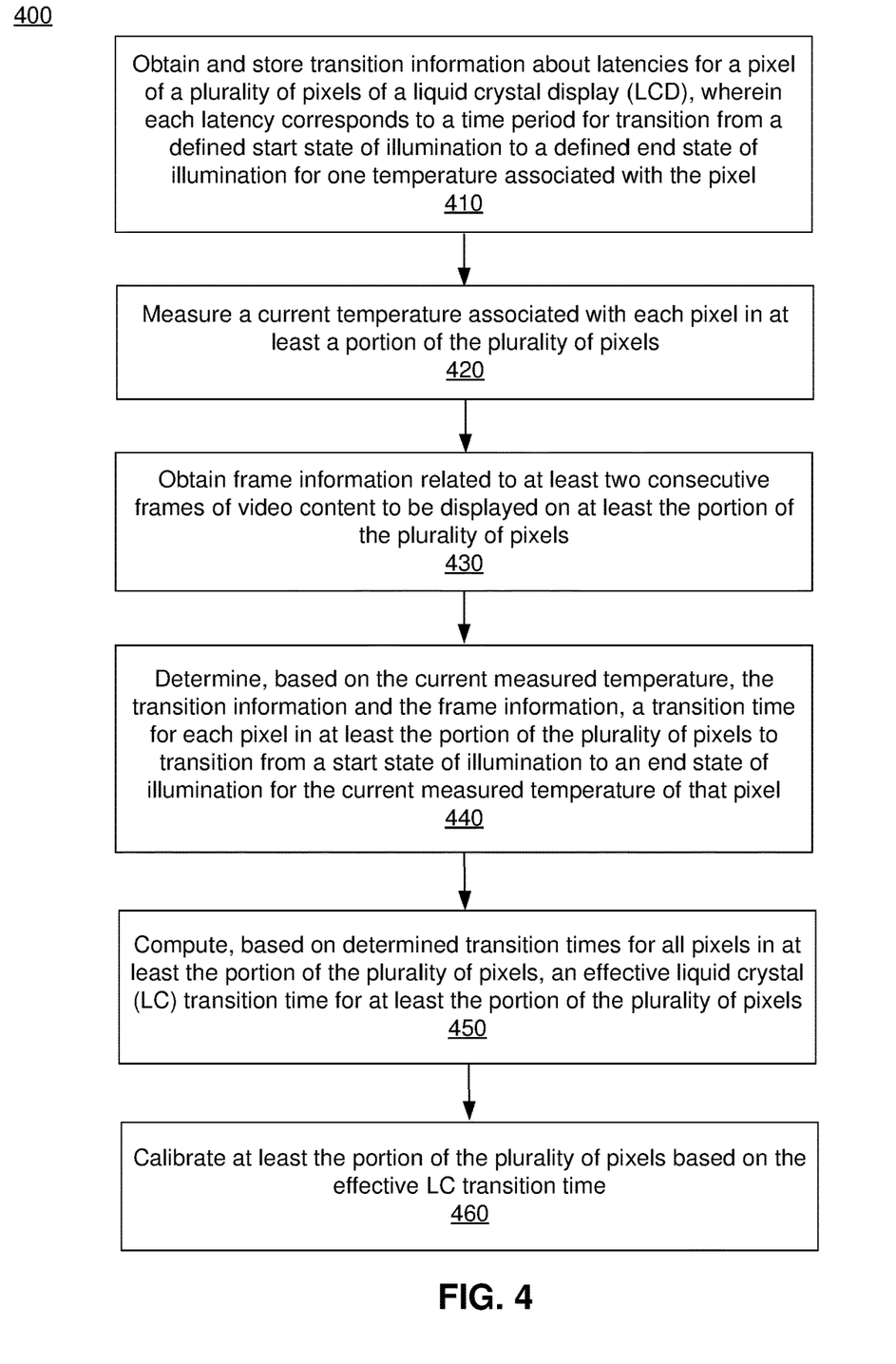
FIG. 4 is a flow chart illustrating a process of display latency calibration of an LCD, which may be implemented at the HMD shown in FIG. 1A, in accordance with an embodiment.

FIG. 4 is a flow chart illustrating a process 400 of display latency calibration of an LCD, in accordance with an embodiment. The process 400 of FIG. 4 may be performed by components of a calibration system, e.g., the calibration system 300 in FIG. 3. Alternatively, the process 400 of FIG. 4 may be performed by components of a HMD, e.g., the HMD 100 in FIG. 1A. Other entities may perform some or all of the steps of the process in other embodiments. Likewise, embodiments may include different and/or additional steps, or perform the steps in different orders.

The calibration system obtains and stores 410 (e.g., in a storage medium) transition information about latencies for a pixel of a plurality of pixels of the LCD, wherein each latency corresponds to a time period for transition from a defined start state of illumination to a defined end state of illumination for one temperature associated with the pixel. The defined start state of illumination is related to an intensity of light emitted from the pixel in a first time instant, and the defined end state of illumination is related to another intensity of light emitted from the pixel in a second time instant consecutive to the first time instant. In one embodiment, the transition information stored in the storage medium of the calibration system is obtained empirically. In an alternate embodiment, the transition information stored in the storage medium of the calibration system is obtained from a manufacturer of the LCD.

The calibration system measures 420 (e.g., via a plurality of temperature sensors coupled to the plurality of pixels of the LCD) a current temperature associated with each pixel in at least a portion of the plurality of pixels. In some embodiments, each temperature sensor of the plurality of temperature sensors is configured to measure the current temperature associated with a different pixel of the plurality of pixels. In alternate embodiments, each temperature sensor of the plurality of temperature sensors is configured to measure one or more current temperatures associated with one or more pixels of the plurality of pixels.

The calibration system obtains 430 (e.g., via a controller coupled to the storage medium and the plurality of temperature sensors) frame information related to at least two consecutive frames of video content to be displayed on at least the portion of the plurality of pixels. In some embodiments, the obtained frame information comprises information about at least two consecutive digital numbers associated with intensities of light emitted from each pixel in at least the portion of the plurality of pixels for the at least two consecutive frames.

The calibration system determines 440 (e.g., via the controller), based on the current measured temperature, the transition information and the frame information, a transition time for each pixel in at least the portion of the plurality of pixels to transition from a start state of illumination to an end state of illumination for the current measured temperature of that pixel. The start state of illumination is related to a first intensity of light emitted from that pixel for a first frame of the at least two consecutive frames, and the end state of illumination is related to a second intensity of light emitted from that pixel for a second frame of the at least two consecutive frames.

The calibration system computes 450 (e.g., via the controller), based on determined transition times for all pixels in at least the portion of the plurality of pixels, an effective LC transition time for at least the portion of the plurality of pixels. In some embodiments, the calibration system computes 450 the effective LC transition time for at least the portion of the plurality of pixels as a longest time period of the determined transition times for all pixels in at least the portion of the plurality of pixels.

The calibration system calibrates 460 (e.g., via the controller) at least the portion of the plurality of pixels based on the effective LC transition time. In some embodiments, the calibration system calibrates 460 at least the portion of the plurality of pixels by delaying illumination of each pixel in at least the portion of the plurality of pixels until the effective LC transition time expires after data scanning of at least the portion of the plurality of pixels is finished.

System Environment

Figure 5:
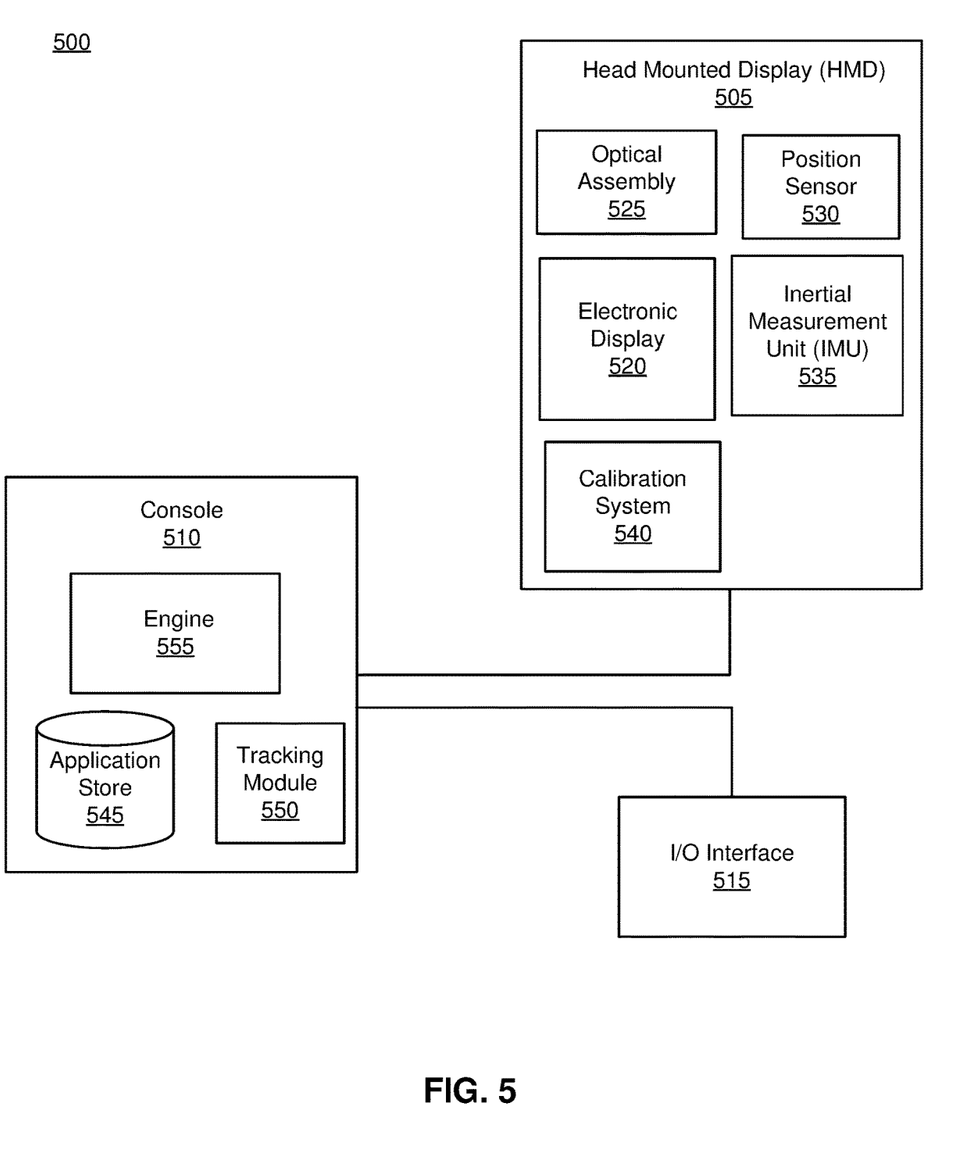
FIG. 5 is a block diagram of a system environment that includes the HMD shown in FIG. 1A, in accordance with an embodiment.

FIG. 5 is a block diagram of one embodiment of a HMD system 500 in which a console 510 operates. The HMD system 500 may operate in a VR system environment, an AR system environment, a MR system environment, or some combination thereof. The HMD system 500 shown by FIG. 5 comprises an HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 100 described above in conjunction with FIG. 1A.

The HMD 505 includes an electronic display 520, an optical assembly 525, one or more position sensors 530, an IMU 535, and a calibration system 540. Some embodiments of the HMD 505 have different components than those described in conjunction with FIG. 5. Additionally, the functionality provided by various components described in conjunction with FIG. 5 may be differently distributed among the components of the HMD 505 in other embodiments.

The electronic display 520 displays 2D or 3D images to the user in accordance with data received from the console 510. In various embodiments, the electronic display 520 comprises a single electronic display or multiple electronic displays (e.g., a display for each eye of a user). In accordance with embodiments of the present disclosure, the electronic display 520 is an LCD panel or LCD. The electronic display 520 may be an embodiment of the LCD 200 in FIG. 2A.

The optical assembly 525 magnifies image light received from the electronic display 520, corrects optical errors associated with the image light, and presents the corrected image light to a user of the HMD 505. In various embodiments, the optical assembly 525 includes one or more optical elements. Example optical elements included in the optical assembly 525 include: an aperture, a Fresnel lens, a convex lens, a concave lens, a filter, a reflecting surface, or any other suitable optical element that affects image light. Moreover, the optical assembly 525 may include combinations of different optical elements. In some embodiments, one or more of the optical elements in the optical assembly 525 may have one or more coatings, such as partially reflective or anti-reflective coatings.

Magnification and focusing of the image light by the optical assembly 525 allows the electronic display 520 to be physically smaller, weigh less and consume less power than larger displays. Additionally, magnification may increase the field of view of the content presented by the electronic display 520. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 525 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 520 for display is predistorted, and the optical assembly 525 corrects the distortion when it receives image light from the electronic display 520 generated based on the content.

The IMU 535 is an electronic device that generates data indicating a position of the HMD 505 based on measurement signals received from one or more of the position sensors 530. A position sensor 530 generates one or more measurement signals in response to motion of the HMD 505. Examples of position sensors 530 include: one or more accelerometers, one or more gyroscopes, one or more magnetometers, another suitable type of sensor that detects motion, a type of sensor used for error correction of the IMU 535, or some combination thereof. The position sensors 530 may be located external to the IMU 535, internal to the IMU 535, or some combination thereof.

Based on the one or more measurement signals from one or more position sensors 530, the IMU 535 generates data indicating an estimated current position of the HMD 505 relative to an initial position of the HMD 505. For example, the position sensors 530 include multiple accelerometers to measure translational motion (forward/back, up/down, left/right) and multiple gyroscopes to measure rotational motion (e.g., pitch, yaw, roll). In some embodiments, the IMU 535 rapidly samples the measurement signals and calculates the estimated current position of the HMD 505 from the sampled data. For example, the IMU 535 integrates the measurement signals received from the accelerometers over time to estimate a velocity vector and integrates the velocity vector over time to determine an estimated current position of a reference point on the HMD 505. Alternatively, the IMU 535 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 535 receives one or more parameters from the console 510. The one or more parameters are used to maintain tracking of the HMD 505. Based on a received parameter, the IMU 535 may adjust one or more IMU parameters (e.g., sample rate). In some embodiments, certain parameters cause the IMU 535 to update an initial position of the reference point so it corresponds to a next position of the reference point. Updating the initial position of the reference point as the next calibrated position of the reference point helps reduce accumulated error associated with the current position estimated the IMU 535. The accumulated error, also referred to as drift error, causes the estimated position of the reference point to "drift" away from the actual position of the reference point over time. In some embodiments of the HMD 505, the IMU 535 may be a dedicated hardware component. In other embodiments, the IMU 535 may be a software component implemented in one or more processors.

The calibration system 540 is configured to perform display latency calibration of the electronic display 520 implemented as an LCD panel that includes a plurality of illumination elements or LC-based pixels organized in a two-dimensional array. The calibration system 540 includes a plurality of temperature sensors coupled to the electronic display 520, a storage medium, and a controller coupled to the temperature sensors and the storage medium. The temperature sensors can be organized as a two-dimensional array or mesh of temperature sensors placed on a top portion of the electronic display 520 and coupled to at least a portion of the plurality of pixels of the electronic display 520. Each temperature sensor in the calibration system 540 can be configured to measure a current temperature associated with at least one pixel in at least the portion of the plurality of pixels. The storage medium of the calibration system 540 stores information about transition latencies for a pixel of the electronic display 520, wherein each transition latency corresponds to a time period for transition from a specific starting state of illumination to a specific ending state of illumination for one temperature associated with the pixel. The controller of the calibration system 540 may obtain, e.g., from the console 510 that provides rendered video frames for displaying on the HMD 505, frame information related to at least two consecutive frames of video content. The frame information obtained at the controller of the calibration system 540 may comprise information about at least two consecutive digital numbers associated with intensities of light emitted from each pixel in at least the portion of the plurality of pixels of the electronic display 520 for the at least two consecutive frames of the video content. The controller of the calibration system 540 determines, based on the current measured temperature, based on the transition information and based on the frame information, a transition time for each pixel in at least the portion of the plurality of pixels to transition from a starting illumination state to an ending illumination state for the current measured temperature of that pixel. The controller of the calibration system 540 computes, based on determined transition times for all pixels in at least the portion of the plurality of pixels, an effective LC transition time for at least the portion of the plurality of pixels. The controller of the calibration system 540 performs calibration of at least a portion of the electronic display 520 based on the effective LC transition time. For example, the controller of the calibration system 540 performs calibration by delaying illumination of all pixels in at least the portion of the electronic display 520 until the effective LC transition time expires. The calibration system 540 may be an embodiment of the calibration system 300 in FIG. 3.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the HMD 505, and the I/O interface 515. In the example shown in FIG. 5, the console 510 includes an application store 545, a tracking module 550, and an engine 555. Some embodiments of the console 510 have different modules or components than those described in conjunction with FIG. 5. Similarly, the functions further described below may be distributed among components of the console 510 in a different manner than described in conjunction with FIG. 5.

The application store 545 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 550 calibrates the HMD system 500 using one or more calibration parameters and may adjust one or more calibration parameters to reduce error in determination of the position of the HMD 505 or of the I/O interface 515. Calibration performed by the tracking module 550 also accounts for information received from the IMU 535 in the HMD 505 and/or an IMU 535 included in the I/O interface 515. Additionally, if tracking of the HMD 505 is lost, the tracking module 550 may re-calibrate some or all of the HMD system 500.

The tracking module 550 tracks movements of the HMD 505 or of the I/O interface 515 using information from the one or more position sensors 530, the IMU 535 or some combination thereof. For example, the tracking module 550 determines a position of a reference point of the HMD 505 in a mapping of a local area based on information from the HMD 505. The tracking module 550 may also determine positions of the reference point of the HMD 505 or a reference point of the I/O interface 515 using data indicating a position of the HMD 505 from the IMU 535 or using data indicating a position of the I/O interface 515 from an IMU 535 included in the I/O interface 515, respectively. Additionally, in some embodiments, the tracking module 545 may use portions of data indicating a position or the HMD 505 from the IMU 535 to predict a future location of the HMD 505. The tracking module 550 provides the estimated or predicted future position of the HMD 505 or the I/O interface 515 to the engine 555.

The engine 555 generates a 3D mapping of the area surrounding the HMD 505 (i.e., the "local area") based on information received from the HMD 505. In some embodiments, the engine 555 determines depth information for the 3D mapping of the local area based on information received from a depth camera assembly of the HMD 505 (not shown in FIG. 5) that is relevant for techniques used in computing depth. The engine 555 may calculate depth information using one or more techniques in computing depth (e.g., structured light, time or flight, or some combination thereof).

The engine 555 also executes applications within the HMD system 500 and receives position information, acceleration information, velocity information, predicted future positions, or some combination thereof, of the HMD 505 from the tracking module 550. Based on the received information, the engine 555 determines content to provide to the HMD 505 for presentation to the user. For example, if the received information indicates that the user has looked to the left, the engine 555 generates content for the HMD 505 that mirrors the user's movement in a virtual environment or in an environment augmenting the local area with additional content. Additionally, the engine 555 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device comprising:
a display having a plurality of pixels; and
a controller configured to:
obtain frame information related to at least two consecutive frames of video content to be displayed on at least a portion of the plurality of pixels,
obtain information about a temperature for at least one pixel in at least the portion of the plurality of pixels,
determine, based at least in part on the temperature and the frame information, a transition time for the at least one pixel to transition from a start state to an end state, wherein the start state is related to a first intensity of light emitted from the at least one pixel for a first frame of the at least two consecutive frames and the end state is related to a second intensity of light emitted from the at least one pixel for a second frame of the at least two consecutive frames,
compute an effective transition time for at least the portion of the plurality of pixels as a longest time period of transition times determined for pixels in at least the portion of the plurality of pixels, and
control illumination of at least the portion of the plurality of pixels by delaying illumination of at least the portion of the plurality of pixels until the effective transition time expires after data scanning of at least the portion of the plurality of pixels is finished.

2. The device of claim 1, wherein the portion of the plurality of pixels comprises all the pixels in the display.

3. The device of claim 1, wherein the controller is further configured to instruct all pixels in at least the portion of the plurality of pixels to illuminate substantially simultaneously, after delaying illumination of the at least one pixel based on the effective transition time.

4. The device of claim 1, wherein the controller is further configured to:
determine transition times for pixels of each segment, of multiple segments of the plurality of pixels, based at least in part on temperatures measured for the pixels in that segment and the frame information; and
compute an effective transition time for that segment as a longest time period of the determined transition times for the pixels in that segment.

5. The device of claim 4, wherein the controller is further configured to instruct substantially simultaneous illumination of all pixels in that segment, after delaying illumination based on the effective transition time for that segment.

6. The device of claim 1, wherein the controller is further configured to:
determine transition times for pixels of a controllable portion of the plurality of pixels, based at least in part on temperatures measured for the pixels of the controllable portion and the frame information; and
compute the effective transition time for the controllable portion as a longest time period of the determined transition times for the pixels of the controllable portion.

7. The device of claim 6, wherein the controller is further configured to:
control a size of the controllable portion of the plurality of pixels; and
instruct substantially simultaneous illumination of all the pixels in the controllable portion, after delaying illumination based on the effective transition time for the controllable portion.

8. The device of claim 1, wherein the frame information comprises information about at least two consecutive digital numbers associated with intensities of light emitted from the at least one pixel in at least the portion of the plurality of pixels for the at least two consecutive frames.

9. The device of claim 1, further comprising at least one temperature sensor coupled to at least the portion of the plurality of pixels, the at least one temperature sensor configured to measure the temperature associated with the at least one pixel.

10. The device of claim 1, wherein the device is integrated into a head-mounted display (HMD).

11. A method comprising:
obtaining frame information related to at least two consecutive frames of video content to be displayed on at least a portion of a plurality of pixels in a display;
obtaining information about a temperature for at least one pixel in at least the portion of the plurality of pixels;
determining, based at least in part on the temperature and the frame information, a transition time for the at least one pixel to transition from a start state to an end state, wherein the start state is related to a first intensity of light emitted from the at least one pixel for a first frame of the at least two consecutive frames and the end state is related to a second intensity of light emitted from the at least one pixel for a second frame of the at least two consecutive frames;
computing an effective transition time for at least the portion of the plurality of pixels as a longest time period of transition times determined for pixels in at least the portion of the plurality of pixels; and
controlling illumination of at least the portion of the plurality of pixels by delaying illumination of at least the portion of the plurality of pixels until the effective transition time expires after data scanning of at least the portion of the plurality of pixels is finished.

12. The method of claim 11, further comprising:
instructing all pixels in at least the portion of the plurality of pixels to illuminate substantially simultaneously, after delaying illumination of the at least one pixel based on the effective transition time.

13. The method of claim 11, further comprising:
determining transition times for pixels of each segment, of multiple segments of the plurality of pixels, based at least in part on temperatures measured for the pixels in that segment and the frame information; and
computing an effective transition time for that segment as a longest time period of the determined transition times for the pixels in that segment.

14. The method of claim 13, further comprising:
instructing substantially simultaneous illumination of all pixels in that segment, after delaying illumination based on the effective transition time for that segment.

15. The method of claim 11, further comprising:
determining transition times for pixels of a controllable portion of the plurality of pixels, based at least in part on temperatures measured for the pixels of the controllable portion and the frame information; and
computing the effective transition time for the controllable portion as a longest time period of the determined transition times for the pixels of the controllable portion.

16. The method of claim 15, further comprising:
controlling a size of the controllable portion of the plurality of pixels; and
instructing substantially simultaneous illumination of all the pixels in the controllable portion, after delaying illumination based on the effective transition time for the controllable portion.

17. A computer program product comprising a non-transitory computer-readable storage medium having instructions encoded thereon that, when executed by one or more processors, cause the one or more processors to:
obtain frame information related to at least two consecutive frames of video content to be displayed on at least a portion of a plurality of pixels in a display;
obtain information about a temperature for at least one pixel in at least the portion of the plurality of pixels;
determine, based at least in part on the temperature and the frame information, a transition time for the at least one pixel to transition from a start state to an end state, wherein the start state is related to a first intensity of light emitted from the at least one pixel for a first frame of the at least two consecutive frames and the end state is related to a second intensity of light emitted from the at least one pixel for a second frame of the at least two consecutive frames;
compute an effective transition time for at least the portion of the plurality of pixels as a longest time period of transition times determined for pixels in at least the portion of the plurality of pixels; and
control illumination of at least the portion of the plurality of pixels by delaying illumination of at least the portion of the plurality of pixels until the effective transition time expires after data scanning of at least the portion of the plurality of pixels is finished.

18. The computer program product of claim 17, wherein the instructions further cause the one or more processors to:
instruct all pixels in at least the portion of the plurality of pixels to illuminate substantially simultaneously, after delaying illumination of the at least one pixel based on the effective transition time.

* * * * *